(12) United States Patent
Fletcher

(10) Patent No.: US 10,214,260 B1
(45) Date of Patent: Feb. 26, 2019

(54) DETACHABLE MOTORCYCLE WINDSHIELD

(71) Applicant: James Fletcher, Ocala, FL (US)

(72) Inventor: James Fletcher, Ocala, FL (US)

( * ) Notice: Subject to any disclaimer, the term of this patent is extended or adjusted under 35 U.S.C. 154(b) by 0 days.

(21) Appl. No.: 15/728,638

(22) Filed: Oct. 10, 2017

(51) Int. Cl.
*B62J 17/04* (2006.01)
*B62J 9/00* (2006.01)

(52) U.S. Cl.
CPC .............. *B62J 17/04* (2013.01); *B62J 9/006* (2013.01)

(58) Field of Classification Search
CPC .............. B62J 9/00; B62J 9/006; B62J 17/04
USPC ......................................................... 296/78.1
See application file for complete search history.

(56) References Cited

U.S. PATENT DOCUMENTS

| | | | |
|---|---|---|---|
| 2,237,594 A | 4/1941 | Leeroy | |
| 4,019,774 A * | 4/1977 | Tsukahara | B62K 19/46 296/78.1 |
| 4,353,590 A | 10/1982 | Wei-Chuan | |
| D273,288 S | 4/1984 | Johnson | |
| 5,857,727 A | 1/1999 | Vetter | |
| 6,176,538 B1 | 1/2001 | Lawson | |
| 6,505,877 B1 | 1/2003 | Devlin | |
| 7,828,359 B2 | 11/2010 | Caprio | |
| 2009/0230715 A1 | 9/2009 | Brinkhorst | |

FOREIGN PATENT DOCUMENTS

WO           199819904 A       5/1998

* cited by examiner

*Primary Examiner* — Dennis H Pedder
(74) *Attorney, Agent, or Firm* — Kyle A. Fletcher, Esq.

(57) ABSTRACT

The detachable motorcycle windshield is a windshield. The detachable motorcycle windshield is configured for use with a motorcycle. The detachable motorcycle windshield removably attaches to the fairing of a motorcycle. The detachable motorcycle windshield is foldable. The detachable motorcycle windshield comprises a windshield, a bracket, and a pouch. The bracket attaches the windshield to the motorcycle. The windshield breaks down into a plurality of sections that are stored in the pouch. The bracket is stored in the pouch.

17 Claims, 7 Drawing Sheets

DETACHABLE MOTORCYCLE WINDSHIELD

CROSS-REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting including land vehicles, more specifically, a weather guard for a rider of a cycle.

SUMMARY OF INVENTION

The detachable motorcycle windshield is a windshield. The detachable motorcycle windshield is configured for use with a motorcycle. The detachable motorcycle windshield removably attaches to the fairing of a motorcycle. The detachable motorcycle windshield is foldable. The detachable motorcycle windshield comprises a windshield, a bracket, and a pouch. The bracket attaches the windshield to the motorcycle. The windshield breaks down into a plurality of sections that are stored in the pouch. The bracket is also stored within the pouch.

These together with additional objects, features and advantages of the detachable motorcycle windshield will be readily apparent to those of ordinary skill in the art upon reading the following detailed description of the presently preferred, but nonetheless illustrative, embodiments when taken in conjunction with the accompanying drawings.

In this respect, before explaining the current embodiments of the detachable motorcycle windshield in detail, it is to be understood that the detachable motorcycle windshield is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the detachable motorcycle windshield.

It is therefore important that the claims be regarded as including such equivalent construction insofar as they do not depart from the spirit and scope of the detachable motorcycle windshield. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
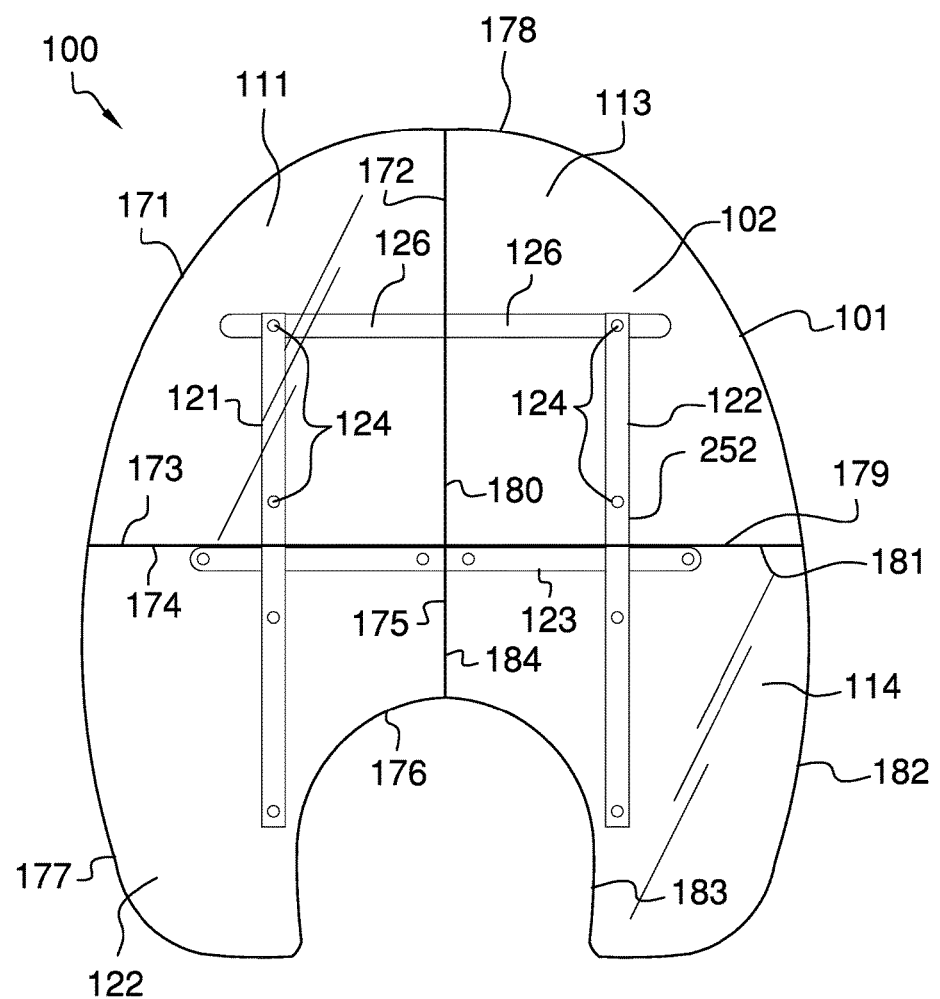
FIG. 1 is a rear view of an embodiment of the disclosure.
Figure 2:
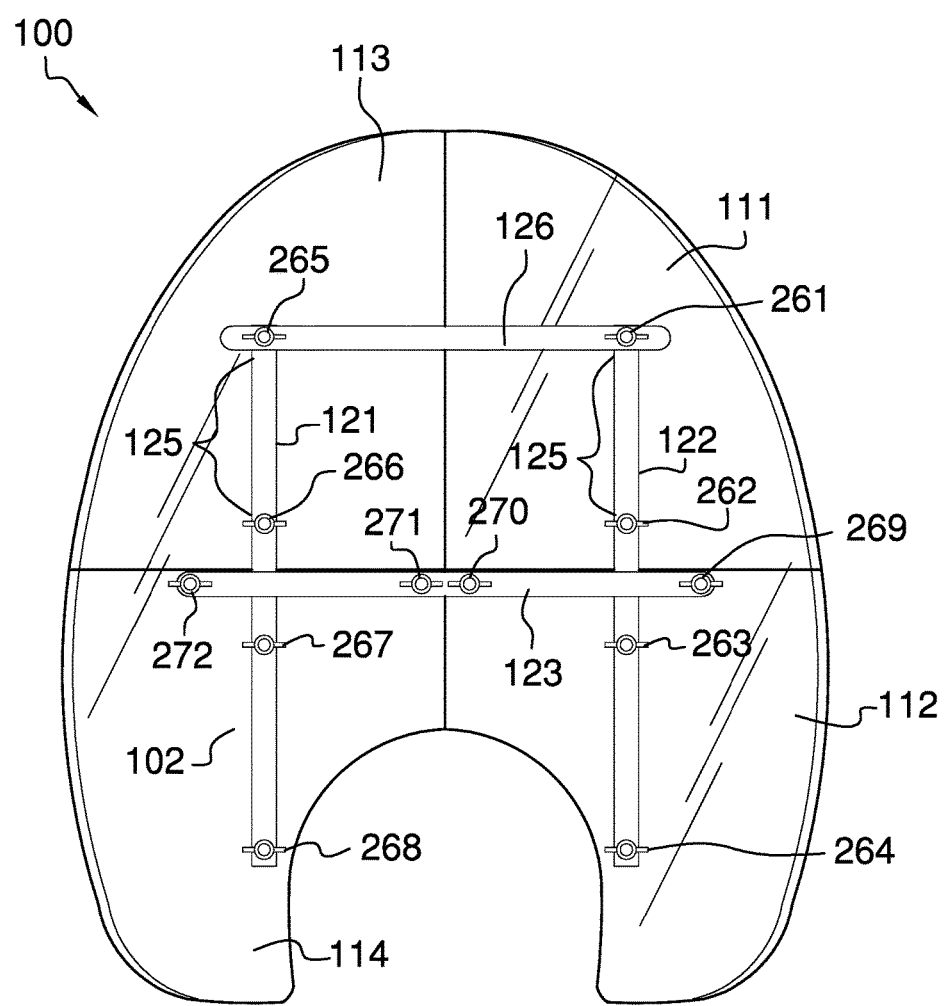
FIG. 2 is a front view of an embodiment of the disclosure.
Figure 3:
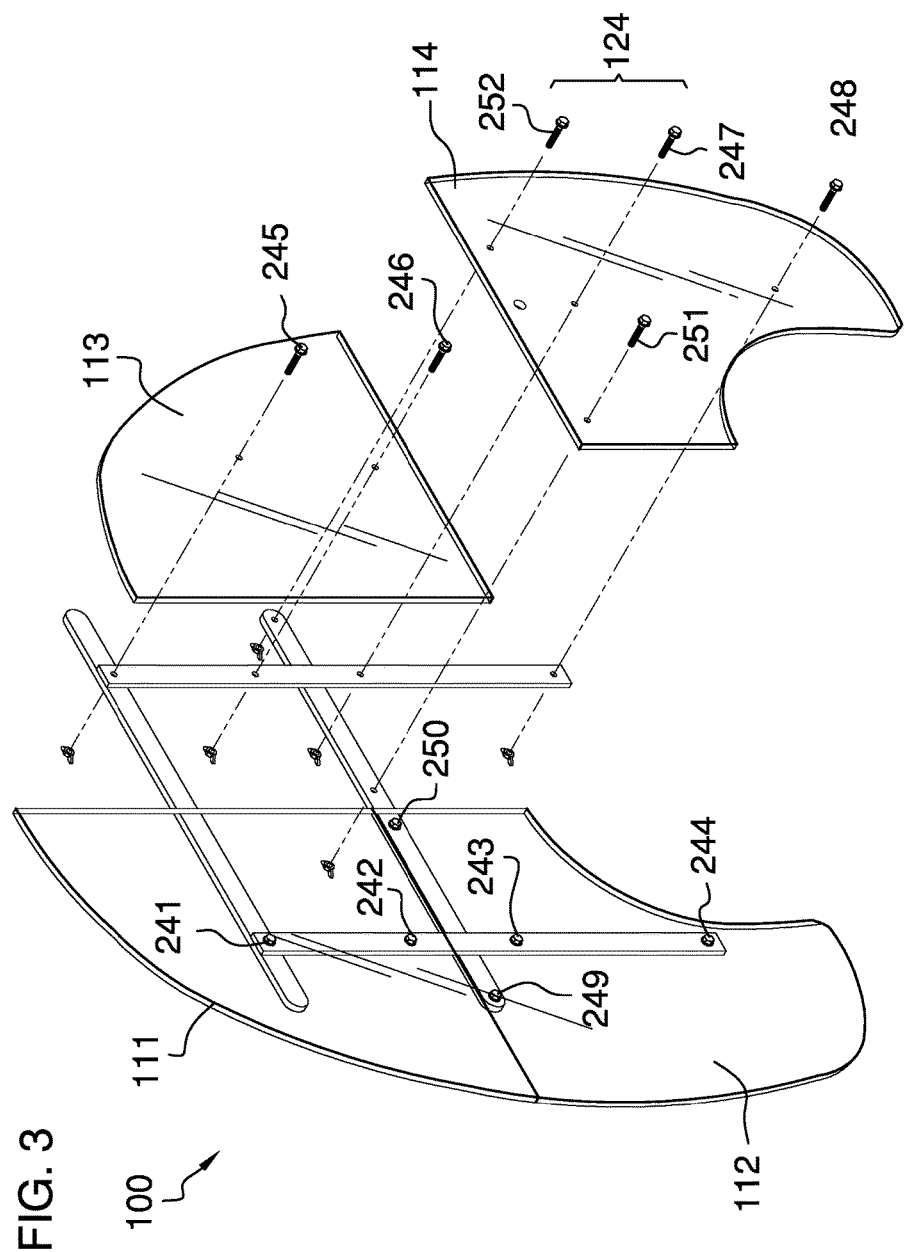
FIG. 3 is an exploded perspective view of an embodiment of the disclosure.
Figure 4:
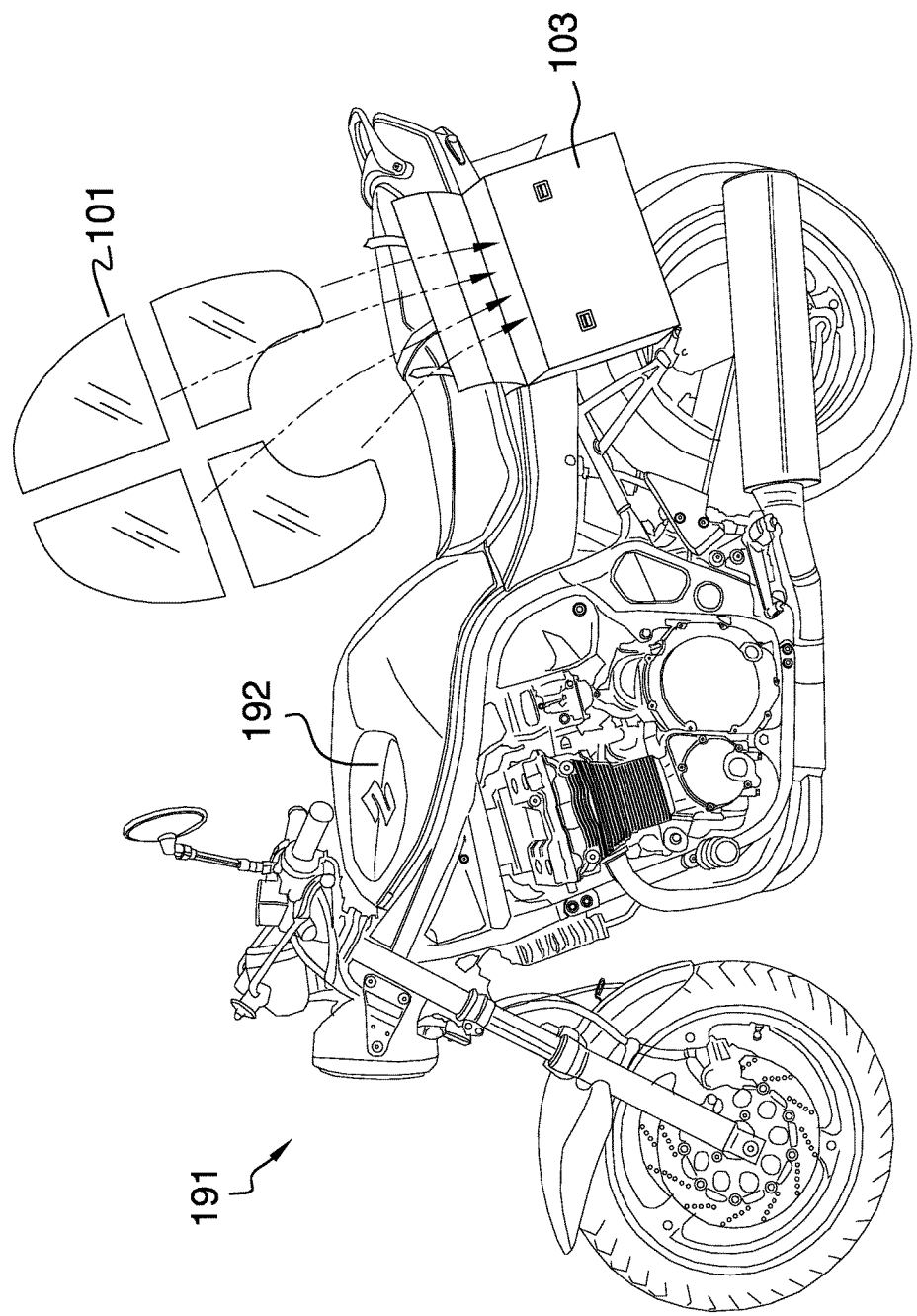
FIG. 4 is a detail view of an embodiment of the disclosure.
Figure 5:
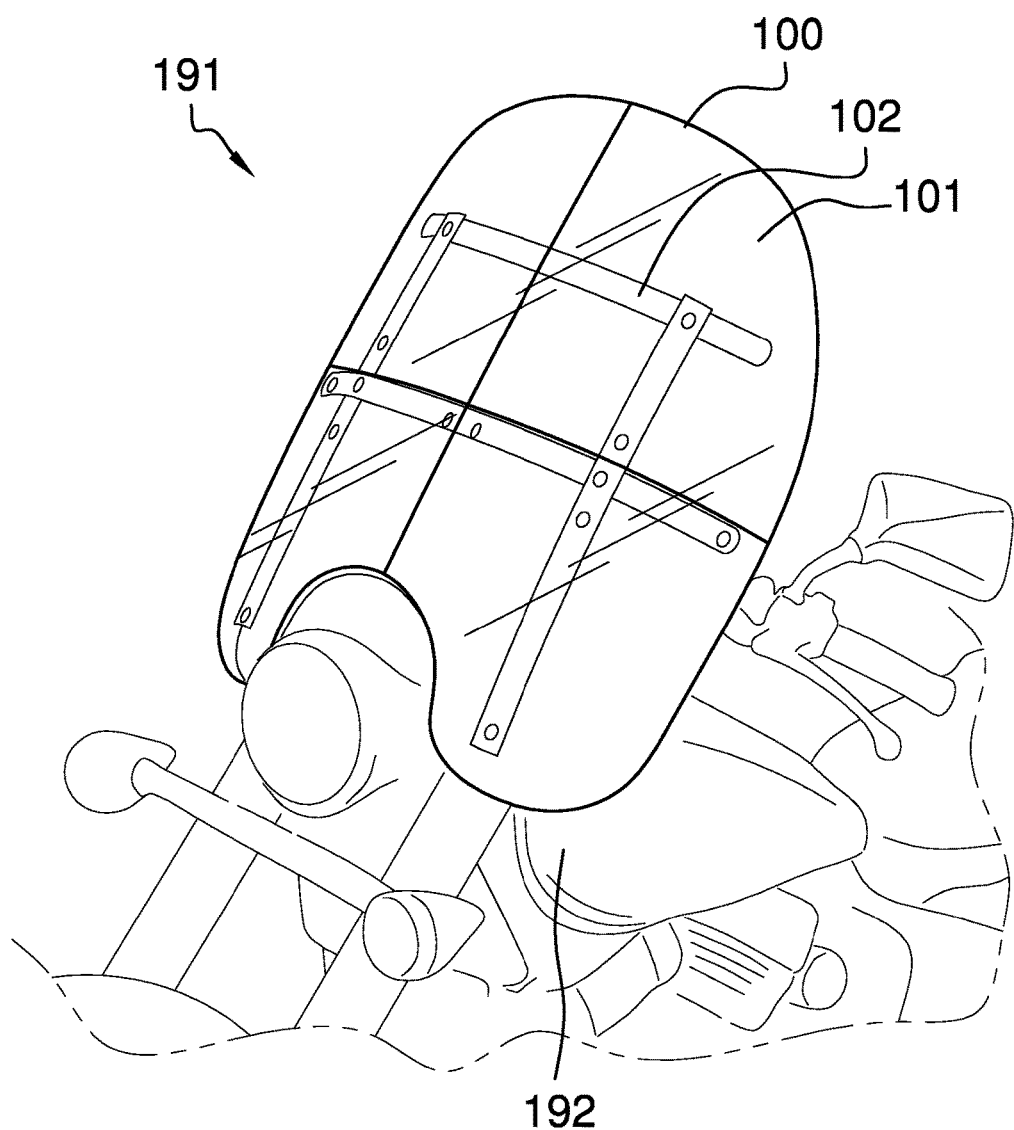
FIG. 5 is an in-use view of an embodiment of the disclosure.
Figure 6:
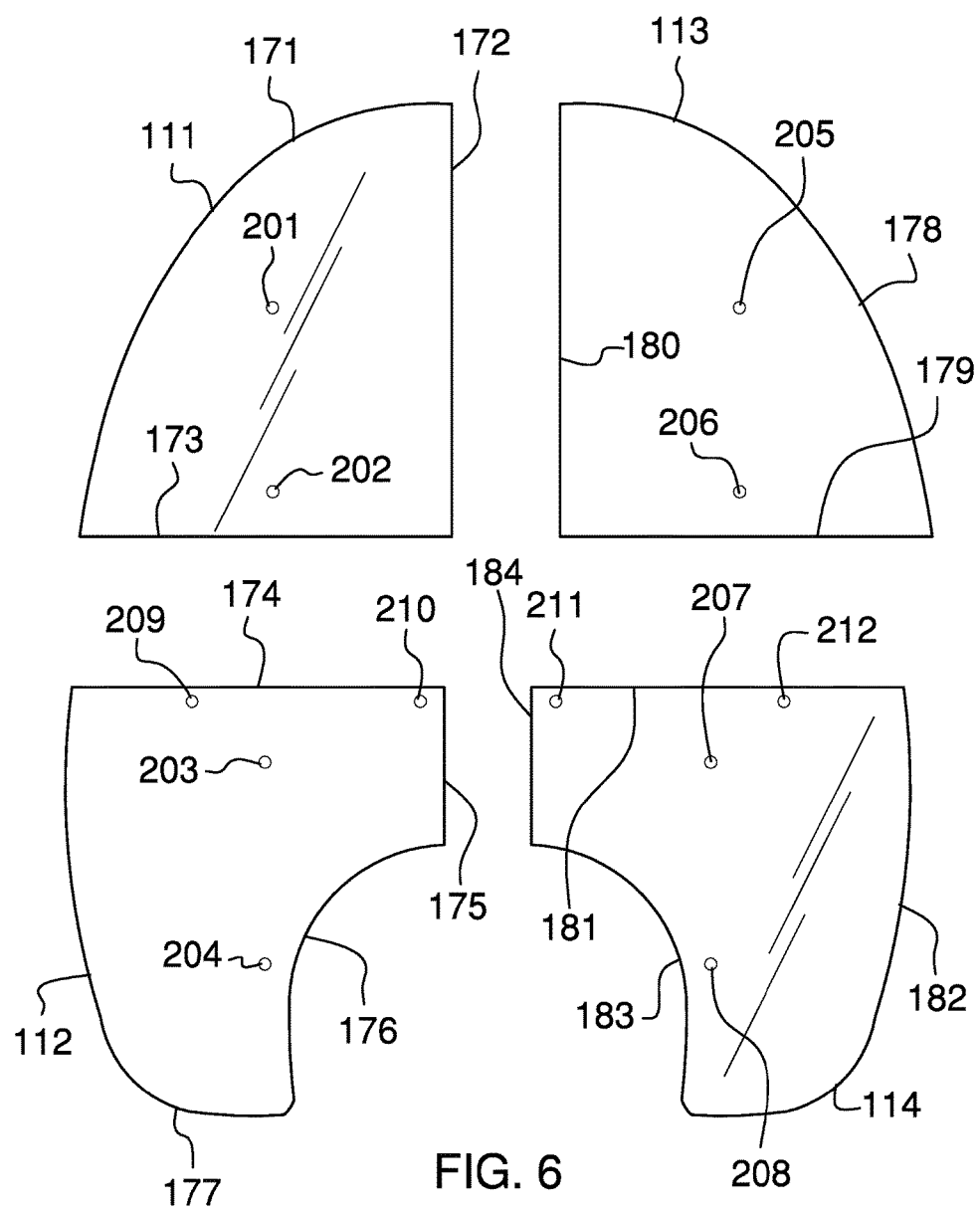
FIG. 6 is a detail view of an embodiment of the disclosure.
Figure 7:
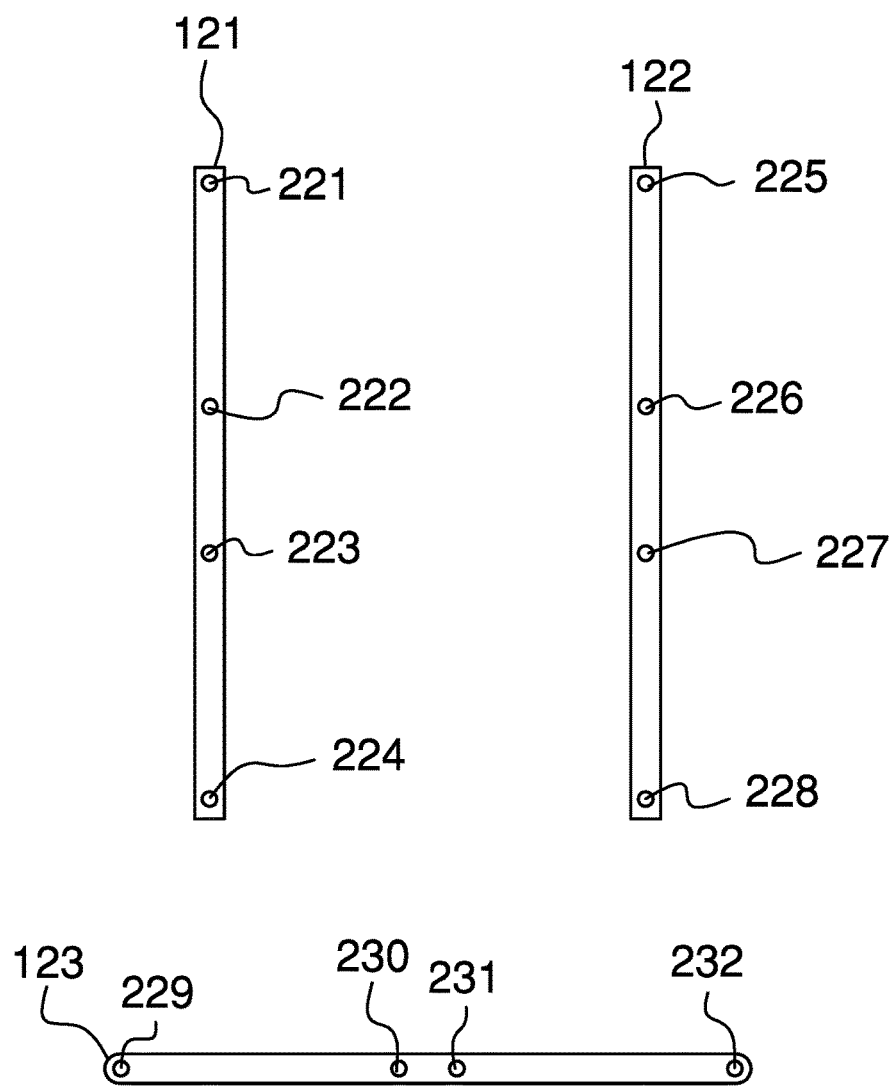
FIG. 7 is a detail view of an embodiment of the disclosure.

Detailed reference will now be made to one or more potential embodiments of the disclosure, which are illustrated in FIGS. 1 through 7.

The detachable motorcycle windshield 100 (hereinafter invention) is a windshield 101. The invention 100 is configured for use with a motorcycle 191. The invention 100 removably attaches to the fairing 192 of a motorcycle 191. The motorcycle 191 is a well-known and documented motorized vehicle. The fairing 192 is a structure of the motorcycle 191 that is described in greater detail elsewhere in this disclosure. The invention 100 is foldable. The invention 100 comprises a windshield 101, a bracket 102, and a pouch 103. The bracket 102 attaches the windshield 101 to the motorcycle 191. The windshield 101 breaks down into a plurality of sections that are stored in the pouch 103. The bracket 102 is stored in the pouch 103.

The bracket 102 is a structure that: 1) assembles the components of the windshield 101 into the windshield 101; and, 2) creates a load path that transfers the weight of the windshield 101 to the motorcycle 191. The use of a bracket 102 to support a load is well known and documented in the mechanical arts. The bracket 102 comprises a left flat bar 121, a right flat bar 122, a lower horizontal flat bar 123, a plurality of bolts 124, and a plurality of nuts 125, and an upper horizontal flat bar 126.

The left flat bar 121 is a commercially available flat metal bar. The left flat bar 121 attaches to the seventh edge 177 of the left lower panel 112. The left flat bar 121 further comprises a first bar aperture 221, a second bar aperture 222, a third bar aperture 223, and a fourth bar aperture 224.

The first bar aperture 221 is an aperture formed through the left flat bar 121. The first bar aperture 221 is sized to receive a bolt selected from the plurality of bolts 124. The second bar aperture 222 is an aperture formed through the left flat bar 121. The second bar aperture 222 is sized to receive a bolt selected from the plurality of bolts 124. The third bar aperture 223 is an aperture formed through the left flat bar 121. The third bar aperture 223 is sized to receive a bolt selected from the plurality of bolts 124. The fourth bar aperture 224 is an aperture formed through the left flat bar 121. The fourth bar aperture 224 is sized to receive a bolt selected from the plurality of bolts 124.

The right flat bar 122 is a commercially available flat metal bar. The right flat bar 122 attaches to the ninth edge 179 of the right lower panel 114. The right flat bar 122 further comprises a fifth bar aperture 225, a sixth bar aperture 226, a seventh bar aperture 227, and an eighth bar aperture 228.

The fifth bar aperture 225 is an aperture formed through the right flat bar 122. The fifth bar aperture 225 is sized to receive a bolt selected from the plurality of bolts 124. The sixth bar aperture 226 is an aperture formed through the right flat bar 122. The sixth bar aperture 226 is sized to receive a bolt selected from the plurality of bolts 124. The seventh bar aperture 227 is an aperture formed through the right flat bar 122. The seventh bar aperture 227 is sized to receive a bolt selected from the plurality of bolts 124. The eighth bar aperture 228 is an aperture formed through the right flat bar 122. The eighth bar aperture 228 is sized to receive a bolt selected from the plurality of bolts 124.

The lower horizontal flat bar 123 is a commercially available flat metal bar. The lower horizontal flat bar 123 attaches to the left lower panel 112 and the right lower panel 114. The upper horizontal flat bar 126 attaches to the left upper panel 111 and the right upper panel 113.

The installation of the lower horizontal flat bar 123 and the upper horizontal flat bar 126 is perpendicular to both the left flat bar 121 and the right flat bar 122. The lower horizontal flat bar 123 further comprises a ninth bar aperture 229, a tenth bar aperture 230, an eleventh bar aperture 231, and a twelfth bar aperture 232. The upper horizontal flat bar 126 is identical to the lower horizontal flat bar 123.

The ninth bar aperture 229 is an aperture formed through the lower horizontal flat bar 123. The ninth bar aperture 229 is sized to receive a bolt selected from the plurality of bolts 124. The tenth bar aperture 230 is an aperture formed through the lower horizontal flat bar 123. The tenth bar aperture 230 is sized to receive a bolt selected from the plurality of bolts 124. The eleventh bar aperture 231 is an aperture formed through the lower horizontal flat bar 123. The eleventh bar aperture 231 is sized to receive a bolt selected from the plurality of bolts 124. The twelfth bar aperture 232 is an aperture formed through the lower horizontal flat bar 123. The twelfth bar aperture 232 is sized to receive a bolt selected from the plurality of bolts 124.

Each of the plurality of bolts 124 is commercially available hardware item that makes an attachment selected from the group consisting of: 1) attaching the left flat bar 121 to the left lower panel 112; 2) attaching the right flat bar 122 to the right lower panel 114; 3) attaching the lower horizontal flat bar 123; or, 4) attaching the upper horizontal flat bar 126 to a panel selected from the group consisting of the left upper panel 111, the left lower panel 112, the right lower panel 114, and the right upper panel 113. The plurality of bolts 124 further comprises a first bolt 241, a second bolt 242, a third bolt 243, a fourth bolt 244, a fifth bolt 245, a sixth bolt 246, a seventh bolt 247, an eighth bolt 248, a ninth bolt 249, a tenth bolt 250, an eleventh bolt 251, and a twelfth bolt 252. The plurality of bolts 124 is described in greater detail elsewhere in this disclosure.

Each of the plurality of nuts 125 is commercially available hardware item that secures a bolt selected from the plurality of bolts 124 to the invention 100. In the first potential embodiment of the disclosure, each of the plurality of nuts 125 is a wing nut that is sized to screw onto any bolt selected from the plurality of bolts 124. The plurality of nuts 125 is described in greater detail elsewhere in this disclosure. The plurality of nuts 125 further comprises a first nut 261, a second nut 262, a third nut 263, a fourth nut 264, a fifth nut 265, a sixth nut 266, a seventh nut 267, an eighth nut 268, a ninth nut 269, a tenth nut 270, an eleventh nut 271, and a twelfth nut 272.

The windshield 101 is a transparent barrier that is positioned to deflect air around the passenger area of the motorcycle 191 while the motorcycle 191 is in motion. The windshield 101 is a well-known and documented device that is commonly used with motorized vehicles. The windshield 101 comprises a left upper panel 111, a left lower panel 112, a right lower panel 114, and a right upper panel 113.

The left upper panel 111 forms the upper left quadrant of the windshield 101. The left upper panel 111 is a transparent panel. The left upper panel 111 further comprises a first window aperture 201 and a second window aperture 202. The left upper panel 111 is further defined with a first edge 171, a second edge 172, and a third edge 173.

The left lower panel 112 forms the lower left quadrant of the windshield 101. The left lower panel 112 is a transparent panel. The left lower panel 112 comprises a third window aperture 203, a fourth window aperture 204, a ninth window aperture 209, and a tenth window aperture 210. The left lower panel 112 is further defined with a fourth edge 174, a fifth edge 175, a sixth edge 176, and a seventh edge 177.

The right upper panel 113 forms the upper right quadrant of the windshield 101. The right upper panel 113 is a transparent panel. The right upper panel 113 further comprises a fifth window aperture 205 and a sixth window aperture 206. The right upper panel 113 is further defined with an eighth edge 178, a ninth edge 179, and a tenth edge 180.

The right lower panel 114 forms the lower right quadrant of the windshield 101. The right lower panel 114 is a transparent panel. The right lower panel 114 comprises a seventh window aperture 207, an eighth window aperture 208, an eleventh window aperture 211, and a twelfth window aperture 212. The right lower panel 114 is further defined with an eleventh edge 181, a twelfth edge 182, a thirteenth edge 183, and a fourteenth edge 184.

The first edge 171 is a curved edge of the left upper panel 111 that forms a portion of the left side of the perimeter of the windshield 101. The second edge 172 is a straight edge of the left upper panel 111 that attaches to the right upper panel 113. The third edge 173 is a straight edge of the left upper panel 111 that attaches to the left lower panel 112.

The seventh edge 177 is a curved edge of the left lower panel 112 that forms the lower left portion of the perimeter of the windshield 101. The fourth edge 174 is a straight edge of the left lower panel 112 that attaches to the left upper panel 114. The sixth edge 176 is a curved edge of the left lower panel 112 that fits around the fairing 192 of the motorcycle 191. The fifth edge 175 is a straight edge of the left lower panel 112 that attaches to the right lower panel 114.

The eighth edge 178 is a curved edge of the right upper panel 113 that forms the upper right portion of the perimeter of the windshield 101. The ninth edge 179 is a straight edge of the right upper panel 113 that attaches to the right lower panel 114. The tenth edge 180 is a straight edge of the right upper panel 113 that attaches to the left upper panel 111.

The eleventh edge 181 is a straight edge of the right lower panel 114 that attaches to the right upper panel 113. The twelfth edge 182 is a curved edge of the right lower panel 113 that forms the lower right portion of the perimeter of the windshield 101. The thirteenth edge 184 is a curved edge of the right lower panel 114 that fits around the fairing 192 of the motorcycle 191. The fourteenth edge 184 is a straight edge of the right lower panel 114 that attaches to the left lower panel 112.

The first window aperture 201 is an aperture formed through the left lower panel 112. The first window aperture 201 is sized to receive a bolt selected from the plurality of bolts 124. The second window aperture 202 is an aperture formed through the left lower panel 112. The second window aperture 202 is sized to receive a bolt selected from the plurality of bolts 124. The third window aperture 203 is an aperture formed through the left lower panel 112. The third window aperture 203 is sized to receive a bolt selected from the plurality of bolts 124. The fourth window aperture 204 is an aperture formed through the left lower panel 112. The fourth window aperture 204 is sized to receive a bolt selected from the plurality of bolts 124. The tenth window aperture 210 is an aperture formed through the left lower panel 112. The tenth window aperture 210 is sized to receive a bolt selected from the plurality of bolts 124.

The fifth window aperture 205 is an aperture formed through the right lower panel 114. The fifth window aperture 205 is sized to receive a bolt selected from the plurality of bolts 124. The sixth window aperture 206 is an aperture formed through the right lower panel 114. The sixth window aperture 206 is sized to receive a bolt selected from the plurality of bolts 124. The seventh window aperture 207 is an aperture formed through the right lower panel 114. The seventh window aperture 207 is sized to receive a bolt selected from the plurality of bolts 124. The eighth window aperture 208 is an aperture formed through the right lower panel 114. The eighth window aperture 208 is sized to receive a bolt selected from the plurality of bolts 124. The eleventh window aperture 211 is an aperture formed through the right lower panel 114. The eleventh window aperture 211 is sized to receive a bolt selected from the plurality of bolts 124.

The ninth window aperture 209 is an aperture formed through the left upper panel 111. The ninth window aperture 209 is sized to receive a bolt selected from the plurality of bolts 124. The twelfth window aperture 212 is an aperture formed through the right upper panel 113. The twelfth window aperture 212 is sized to receive a bolt selected from the plurality of bolts 124.

The pouch 103 is a luggage item that is used to store all of the components of the invention 100. The pouch 103 may have individual compartments that store each item of the invention 100 so as to protect all of the invention 100 from damage during non-use or loss. The pouch 103 stores the windshield 101 and the bracket 102 in a transportable manner when the invention 100 is not in use.

The assembly of the invention 100 is described in the following seven paragraphs.

The second edge 172 of the left upper panel 111 is placed next to and aligned with the tenth edge 180 of the right upper panel 113. The fourth edge 174 of the left lower panel 112 is placed next to and aligned with the third edge 173 of the left upper panel 111. The ninth edge 179 of the right upper panel 113 is placed next to and aligned with the eleventh edge 181 of the right lower panel 114. The fifth edge 175 of the left lower panel 112 is placed next to and aligned with the fourteenth edge 18 of the right lower panel 114.

The first window aperture 201 of the left upper panel 111 aligns with the first bar aperture 221 of the left flat bar 121 such that the first bolt 241 inserts through both the first window aperture 201 and the first bar aperture 221. The first window aperture 201 of the left lower panel 112 aligns with the upper horizontal flat bar 126 such that the tenth bolt 250 inserts upper horizontal flat bar 126. The first nut 261 screws onto the first bolt 241.

The second window aperture 202 of the left upper panel 111 aligns with the second bar aperture 222 of the left flat bar 121 such that the second bolt 242 inserts through both the second window aperture 202 and the second bar aperture 222. The second nut 262 screws onto the second bolt 242. The third window aperture 203 of the left lower panel 112 aligns with the third bar aperture 223 of the left flat bar 121 such that the third bolt 243 inserts through both the third window aperture 203 and the third bar aperture 223. The third nut 263 screws onto the third bolt 243.

The fourth window aperture 204 of the left lower panel 112 aligns with the fourth bar aperture 224 of the left flat bar 121 such that the fourth bolt 244 inserts through both the fourth window aperture 204 and the fourth bar aperture 224. The fourth nut 264 and the fourth bolt 244 secure the left flat bar 121 and the left lower panel 112 to the fairing 192 of the motorcycle 191.

The fifth window aperture 205 of the right upper panel 113 aligns with the fifth bar aperture 225 of the right flat bar 122 such that the fifth bolt 245 inserts through both the fifth window aperture 205 and the fifth bar aperture 225. The first window aperture 201 of the left lower panel 112 aligns with the upper horizontal flat bar 126 such that the tenth bolt 250 inserts upper horizontal flat bar 126. The fifth nut 265 screws onto the fifth bolt 245.

The sixth window aperture 206 of the right upper panel 113 aligns with the sixth bar aperture 226 of the right flat bar 122 such that the sixth bolt 246 inserts through both the sixth window aperture 206 and the sixth bar aperture 226. The sixth nut 266 screws onto the sixth bolt 246.

The seventh window aperture 207 of the right lower panel 114 aligns with the seventh bar aperture 227 of the right flat bar 122 such that the seventh bolt 247 inserts through both the seventh window aperture 207 and the seventh bar aperture 227. The seventh nut 267 screws onto the seventh bolt 247.

The eighth window aperture 208 of the right lower panel 114 aligns with the eighth bar aperture 228 of the right flat bar 122 such that the eighth bolt 248 inserts through both the eighth window aperture 208 and the eighth bar aperture 228. The eighth nut 268 and the eighth bolt 248 secure the right flat bar 122 and the right lower panel 114 to the fairing 192 of the motorcycle 191.

The ninth window aperture 209 of the left lower panel 112 aligns with the ninth bar aperture 229 of the lower horizontal flat bar 123 such that the ninth bolt 249 inserts through both the ninth window aperture 209 and the ninth bar aperture 229. The ninth nut 269 screws onto the ninth bolt 249. The tenth window aperture 210 of the left lower panel 112 aligns with the tenth bar aperture 230 of the lower horizontal flat bar 123 such that the tenth bolt 250 inserts through both the tenth window aperture 210 and the tenth bar aperture 230. The tenth nut 270 screws onto the tenth bolt 250.

The eleventh window aperture 211 of the right lower panel 114 aligns with the eleventh bar aperture 231 of the lower horizontal flat bar 123 such that the eleventh bolt 251 inserts through both the eleventh window aperture 211 and the eleventh bar aperture 231. The eleventh nut 271 screws onto the eleventh bolt 251. The twelfth window aperture 212 of the right upper panel 113 aligns with the twelfth bar aperture 232 of the lower horizontal flat bar 123 such that the twelfth bolt 252 inserts through both the twelfth window aperture 212 and the twelfth bar aperture 232. The twelfth nut 272 screws onto the twelfth bolt 252.

The storage of the invention 100 in the pouch 103 is described this paragraph. The left upper panel 111, the left lower panel 112, the right lower panel 114, and the right upper panel 113 are removed from the motorcycle 191, separated, and placed in the pouch 103.

The following definitions and directional references were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Arc: As used in this disclosure, an arc refers to a portion of a circumference or a curved perimeter. When applied to an angle, the arc also refers to a measure of an angular span as measured from a circle at the vertex formed by the sides of the angle.

Arcuate: As used in this disclosure, arcuate describes the curve formed by a bent bow.

Bolt: As used in this disclosure, a bolt is a cylindrical shaft formed with an exterior screw thread. A bolt is defined with an outer diameter.

Bracket: As used in this disclosure, a bracket is a mechanical structure that attaches a second structure to a first structure such that the load path of the second structure is fully transferred to the first structure.

Exterior Screw Thread: An exterior screw thread is a ridge wrapped around the outer surface of a tube in the form of a helical structure that is used to convert rotational movement into linear movement.

Fairing: As used in this disclosure, the fairing refers to the front end structure of a motorcycle located above the forks.

Interior Screw Thread: An interior screw thread is a groove formed on the inner surface of a tube in the form of a helical structure that is used to convert rotational movement into linear movement.

Load Path: As used in this disclosure, a load path refers to a chain of one or more structures that transfers a load generated by a raised structure or object to a foundation, supporting surface, or the earth.

Luggage: As used in this disclosure, luggage is a trunk, bag, parcel, suitcase, or backpack in which contains domestic articles during travel.

Motorcycle: As used in this disclosure, a motorcycle is a commercially available motorized vehicle with wheels that is intended for carrying one or more passengers.

Nut: As used in this disclosure, a nut is a first object that is formed with a cylindrical negative space that further comprises an interior screw thread such that a second object with a matching exterior screw thread screws into the first object forming a threaded connection. A nut is further defined with an inner diameter.

Perimeter: As used in this disclosure, a perimeter is one or more curved or straight lines that bound an enclosed area on a plane or surface. The perimeter of a circle is commonly referred to as a circumference.

Pocket: As used in this disclosure, a pocket is a small pouch or storage space formed into an object. Pockets are often formed by joining a second textile or a second sheeting to a first textile or a first sheeting, respectively, by sewing or heat sealing respectively.

Screw: When used as a verb in this disclosure, to screw means: 1) to fasten or unfasten (unscrew) a threaded connection; or 2) to attach a helical structure to a solid structure.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Transparent: As used in this disclosure, transparent refers to a material that allows light to pass through the material without significant scattering such that an object can be clearly seen through the material.

Vehicle: As used in this disclosure, a vehicle is a device used for transporting passengers, goods, or equipment. The term motorized vehicle refers to a vehicle can move under power provided by an electric motor or an internal combustion engine.

Windshield: As used in this disclosure, a windshield refers to the front window of a vehicle that is intended to shield the occupants of the vehicle from the wind generated by the normal forward motion of the vehicle.

The directional references used in this disclosure correspond to the directional references from the perspective of the vehicle. The front is the side of the vehicle proximal to the normal direction of travel. The rear side is the side of the vehicle that is distal from the front. The inferior side is the side of the vehicle that is closest to the ground. The superior side of the vehicle is the side of the vehicle that is distal to the inferior side. The left side is to the left side of a person facing the direction of normal, or forward travel. The right side is the side of the vehicle that is distal from the left side.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A vehicle weather guard comprising:
   a windshield, a bracket, and a pouch;
   wherein the windshield breaks down into a plurality of components stored in the pouch;

wherein the bracket is stored in the pouch;
wherein the vehicle weather guard is configured for use with a motorcycle;
wherein the motorcycle further comprises a fairing;
wherein the vehicle weather guard removably attaches to the fairing of the motorcycle;
wherein the bracket creates a load path that transfers the weight of the windshield to the motorcycle;
wherein the windshield is a transparent barrier that deflects air around the motorcycle while the motorcycle is in motion;
wherein the windshield further comprises a left upper panel, a left lower panel, a right lower panel, and a right upper panel;
wherein the bracket interconnects the left upper panel, the left lower panel, the right lower panel, and the right upper panel.

2. The vehicle weather guard according to claim 1
wherein the bracket comprises a left flat bar, a right flat bar, a lower horizontal flat bar, an upper horizontal flat bar, a plurality of bolts, and a plurality of nuts;
wherein the plurality of bolts and the plurality of nuts attach the left flat bar to the windshield;
wherein the plurality of bolts and the plurality of nuts attach the right flat bar to the windshield;
wherein the plurality of bolts and the plurality of nuts attach the lower horizontal flat bar to the windshield.

3. The vehicle weather guard according to claim 2
wherein the left flat bar is a flat metal bar;
wherein the right flat bar is a flat metal bar;
wherein the lower horizontal flat bar is a flat metal bar;
wherein the upper horizontal flat bar is a flat metal bar.

4. The vehicle weather guard according to claim 3
wherein the left flat bar further comprises a first bar aperture, a second bar aperture, a third bar aperture, and a fourth bar aperture;
wherein the right flat bar further comprises a fifth bar aperture, a sixth bar aperture, a seventh bar aperture, and an eighth bar aperture;
wherein the lower horizontal flat bar further comprises a ninth bar aperture, a tenth bar aperture, an eleventh bar aperture, and a twelfth bar aperture;
wherein the first bar aperture is an aperture formed through the left flat bar;
wherein the second bar aperture is an aperture formed through the left flat bar;
wherein the third bar aperture is an aperture formed through the left flat bar;
wherein the fourth bar aperture is an aperture formed through the left flat bar;
wherein the fifth bar aperture is an aperture formed through the right flat bar;
wherein the sixth bar aperture is an aperture formed through the right flat bar;
wherein the seventh bar aperture is an aperture formed through the right flat bar;
wherein the eighth bar aperture is an aperture formed through the right flat bar;
wherein the ninth bar aperture is an aperture formed through the lower horizontal flat bar;
wherein the tenth bar aperture is an aperture formed through the lower horizontal flat bar;
wherein the eleventh bar aperture is an aperture formed through the lower horizontal flat bar;
wherein the twelfth bar aperture is an aperture formed through the lower horizontal flat bar;
wherein the first bar aperture is sized to receive a bolt selected from the plurality of bolts;
wherein the second bar aperture is sized to receive a bolt selected from the plurality of bolts;
wherein the third bar aperture is sized to receive a bolt selected from the plurality of bolts;
wherein the fourth bar aperture is sized to receive a bolt selected from the plurality of bolts;
wherein the fifth bar aperture is sized to receive a bolt selected from the plurality of bolts;
wherein the sixth bar aperture is sized to receive a bolt selected from the plurality of bolts;
wherein the seventh bar aperture is sized to receive a bolt selected from the plurality of bolts;
wherein the eighth bar aperture is sized to receive a bolt selected from the plurality of bolts;
wherein the ninth bar aperture is sized to receive a bolt selected from the plurality of bolts;
wherein the tenth bar aperture is sized to receive a bolt selected from the plurality of bolts;
wherein the eleventh bar aperture is sized to receive a bolt selected from the plurality of bolts;
wherein the twelfth bar aperture is sized to receive a bolt selected from the plurality of bolts.

5. The vehicle weather guard according to claim 4
wherein each of the plurality of nuts secures a bolt selected from the plurality of bolts to the vehicle weather guard;
wherein each of the plurality of nuts is sized to screw onto any bolt selected from the plurality of bolts.

6. The vehicle weather guard according to claim 5
wherein each of the plurality of bolts makes an attachment selected from the group consisting of:
A) attaching the left flat bar to the left lower panel;
B) attaching the right flat bar to the right lower panel;
C) attaching the lower horizontal flat bar to a panel selected from the group consisting of the left lower panel, and the right lower panel; or,
D) attaching the upper horizontal flat bar to a panel selected from the group consisting of the left upper panel, and the right upper panel.

7. The vehicle weather guard according to claim 6
wherein the lower horizontal flat bar attaches to the left lower panel and the right lower panel;
wherein the upper horizontal flat bar attaches to the left upper panel and the right upper panel;
wherein the installation of the lower horizontal flat bar is perpendicular to both the left flat bar and the right flat bar;
wherein the installation of the upper horizontal flat bar is perpendicular to both the left flat bar and the right flat bar.

8. The vehicle weather guard according to claim 7
wherein the left upper panel is a transparent panel;
wherein the left lower panel is a transparent panel;
wherein the right lower panel is a transparent panel;
wherein the right upper panel is a transparent panel.

9. The vehicle weather guard according to claim 8
wherein the left upper panel forms the upper left quadrant of the windshield;
wherein the left lower panel forms the lower left quadrant of the windshield;
wherein the right upper panel forms the upper right quadrant of the windshield;
wherein the right lower panel forms the lower right quadrant of the windshield;

wherein the left upper panel is further defined with a first edge, a second edge, and a third edge;
wherein the left the left lower panel is further defined with a fourth edge, a fifth edge, a sixth edge, and a seventh edge;
wherein the right upper panel is further defined with an eighth edge, a ninth edge, and a tenth edge;
wherein the right lower panel is further defined with an eleventh edge, a twelfth edge, a thirteenth edge, and a fourteenth edge.

10. The vehicle weather guard according to claim 9
wherein the left upper panel further comprises a first window aperture and a second window aperture;
wherein the left lower panel comprises a third window aperture, a fourth window aperture, a ninth window aperture, and a tenth window aperture;
wherein the right upper panel further comprises a fifth window aperture and a sixth window aperture;
wherein the right lower panel comprises a seventh window aperture, an eighth window aperture, an eleventh window aperture, and a twelfth window aperture;
wherein the first window aperture is an aperture formed through the left upper panel;
wherein the second window aperture is an aperture formed through the left upper panel;
wherein the third window aperture is an aperture formed through the left lower panel;
wherein the fourth window aperture is an aperture formed through the left lower panel;
wherein the fifth window aperture is an aperture formed through the right upper panel;
wherein the sixth window aperture is an aperture formed through the right upper panel;
wherein the seventh window aperture is an aperture formed through the right lower panel;
wherein the eighth window aperture is an aperture formed through the right lower panel;
wherein the ninth window aperture is an aperture formed through the left lower panel;
wherein the tenth window aperture is an aperture formed through the left lower panel;
wherein the eleventh window aperture is an aperture formed through the right lower panel;
wherein the twelfth window aperture is an aperture formed through the right lower panel;
wherein the first window aperture is sized to receive a bolt selected from the plurality of bolts;
wherein the second window aperture is sized to receive a bolt selected from the plurality of bolts;
wherein the third window aperture is sized to receive a bolt selected from the plurality of bolts;
wherein the fourth window aperture is sized to receive a bolt selected from the plurality of bolts;
wherein the fifth window aperture is sized to receive a bolt selected from the plurality of bolts;
wherein the sixth window aperture is sized to receive a bolt selected from the plurality of bolts;
wherein the seventh window aperture is sized to receive a bolt selected from the plurality of bolts;
wherein the eighth window aperture is sized to receive a bolt selected from the plurality of bolts;
wherein the ninth window aperture is sized to receive a bolt selected from the plurality of bolts;
wherein the tenth window aperture is sized to receive a bolt selected from the plurality of bolts;
wherein the eleventh window aperture is sized to receive a bolt selected from the plurality of bolts;
wherein the twelfth window aperture is sized to receive a bolt selected from the plurality of bolts.

11. The vehicle weather guard according to claim 10
the second edge of the left upper panel is placed next to and aligned with the tenth edge of the right upper panel;
wherein the fourth edge of the left lower panel is placed next to and aligned with the third edge of the left upper panel;
wherein the ninth edge of the right upper panel is placed next to and aligned with the eleventh edge of the right lower panel;
wherein the fifth edge of the left lower panel is placed next to and aligned with the fourteenth edge of the right lower panel.

12. The vehicle weather guard according to claim 11
wherein the plurality of bolts further comprises a first bolt, a second bolt, a third bolt, a fourth bolt, a fifth bolt, a sixth bolt, a seventh bolt, an eighth bolt, a ninth bolt, a tenth bolt, an eleventh bolt, and a twelfth bolt;
the first window aperture of the left upper panel aligns with the first bar aperture of the left flat bar such that the first bolt inserts through both the first window aperture and the first bar aperture;
wherein the second window aperture of the left upper panel aligns with the second bar aperture of the left flat bar such that the second bolt inserts through both the second window aperture and the second bar aperture;
wherein the third window aperture of the left lower panel aligns with the third bar aperture of the left flat bar such that the third bolt inserts through both the third window aperture and the third bar aperture;
wherein the fourth window aperture of the left lower panel aligns with the fourth bar aperture of the left flat bar such that the fourth bolt inserts through both the fourth window aperture and the fourth bar aperture;
wherein the fifth window aperture of the right upper panel aligns with the fifth bar aperture of the right flat bar such that the fifth bolt inserts through both the fifth window aperture and the fifth bar aperture;
wherein the sixth window aperture of the right upper panel aligns with the sixth bar aperture of the right flat bar such that the sixth bolt inserts through both the sixth window aperture and the sixth bar aperture;
wherein the seventh window aperture of the right lower panel aligns with the seventh bar aperture of the right flat bar such that the seventh bolt inserts through both the seventh window aperture and the seventh bar aperture;
wherein the eighth window aperture of the right lower panel aligns with the eighth bar aperture of the right flat bar such that the eighth bolt inserts through both the eighth window aperture and the eighth bar aperture;
wherein the ninth window aperture of the left lower panel aligns with the ninth bar aperture of the lower horizontal flat bar such that the ninth bolt inserts through both the ninth window aperture and the ninth bar aperture;
wherein the tenth window aperture of the left lower panel aligns with the tenth bar aperture of the lower horizontal flat bar such that the tenth bolt inserts through both the tenth window aperture and the tenth bar aperture;
wherein the eleventh window aperture of the right lower panel aligns with the eleventh bar aperture of the lower horizontal flat bar such that the eleventh bolt inserts through both the eleventh window aperture and the eleventh bar aperture;
wherein the twelfth window aperture of the right lower panel aligns with the twelfth bar aperture of the lower horizontal flat bar such that the twelfth bolt inserts through both the twelfth window aperture and the twelfth bar aperture.

13. The vehicle weather guard according to claim 12 wherein the first window aperture of the left upper panel aligns with the upper horizontal flat bar such that the tenth bolt inserts upper horizontal flat bar.

14. The vehicle weather guard according to claim 13 wherein the plurality of nuts further comprises a first nut, a second nut, a third nut, a fourth nut, a fifth nut, a sixth nut, a seventh nut, an eighth nut, a ninth nut, a tenth nut, an eleventh nut, and a twelfth nut;

wherein the first nut screws onto the first bolt;
wherein the second nut screws onto the second bolt;
wherein the third nut screws onto the third bolt;
wherein the fifth nut screws onto the fifth bolt;
wherein the sixth nut screws onto the sixth bolt;
wherein the seventh nut screws onto the seventh bolt;
wherein the ninth nut screws onto the ninth bolt;
wherein the tenth nut screws onto the tenth bolt;
wherein the eleventh nut screws onto the eleventh bolt;
wherein the twelfth nut screws onto the twelfth bolt.

15. The vehicle weather guard according to claim 14 wherein the fourth nut and the fourth bolt secure the left flat bar to the left lower panel;
wherein the eighth nut and the eighth bolt secure the right flat bar to the right lower panel.

16. The vehicle weather guard according to claim 15 wherein the left upper panel, the left lower panel, the right lower panel, and the right upper panel are removed from the motorcycle, separated, and placed in the pouch along with the bracket.

17. The vehicle weather guard according to claim 16 wherein each of the plurality of nuts is a wingnut.

* * * * *